Sept. 10, 1935.   O. SEVERSON   2,013,701
CAM LOCK FOR TOOL BITS
Filed June 14, 1932
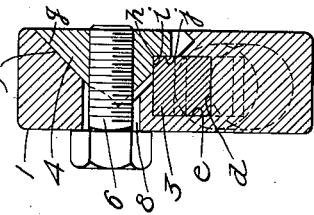
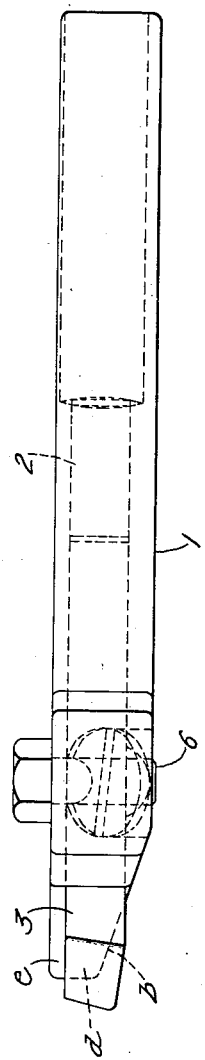
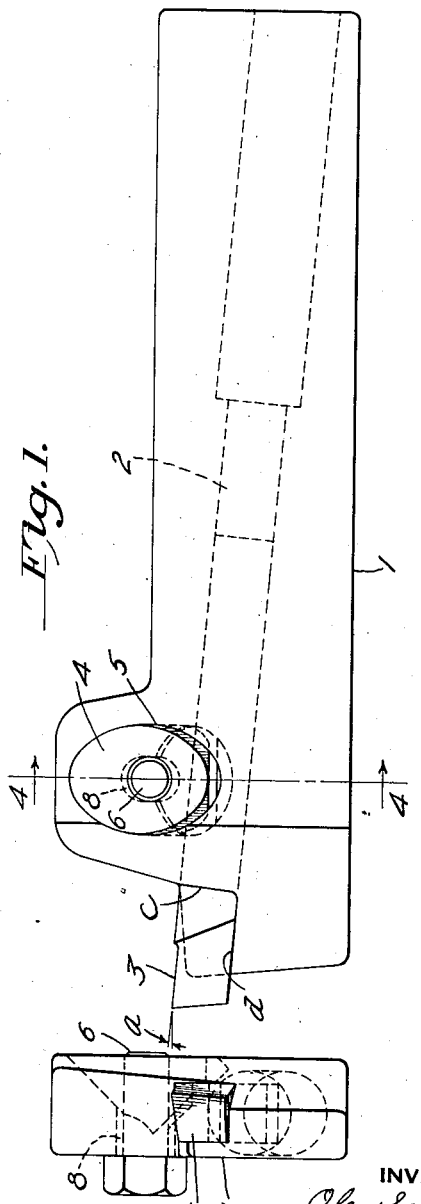
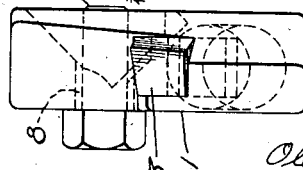
INVENTOR-
Ole Severson
BY
Nathan, Bowman & Helfrich
ATTORNEYS- Patented Sept. 10, 1935

2,013,701

UNITED STATES PATENT OFFICE 2,013,701

CAM LOCK FOR TOOL BITS

Ole Severson, Shelton, Conn., assignor to The O. K. Tool Company, Inc., New York, N. Y., a corporation of New York Application June 14, 1932, Serial No. 617,177

2 Claims. (Cl. 29—99)

This invention relates to metal cutting tools in general and more particularly to an improved blade lock for holders of the insertable blade type.

It has for its primary object to provide a tool holder with an improved means for clamping the inserted blade or bit rigidly and securely to the holder member and in such manner that the force or impact of the cutting operation is transmitted directly to the holder body instead of through the blade clamping or locking means.

Still another object is to provide a tool holder that will afford ample support for the blade member along substantially its entire bottom face as well as along the side or rear faces thereof, thereby to lend rigidity and firmness to the entire tool bit and particularly to those regions or portions of the bit adjacent the cutting edges thereof which receive the greatest impacts of the cutting operation. And as a further refinement to arrange the holder in such manner that the blade aperture formed therein is provided with contiguous side walls completely enclosing the shank portion of the tool bit thereby to eliminate the springing or flexing action inherent in holders that have open or composite blade apertures and completely to enclose substantially the entire blade member.

Another object of this invention is to provide a solid body member of relatively narrow proportions adaptable for tooling operations in confined or restricted spaces and to provide quickly and easily adjustable clamping means located somewhat rearwardly of the cutting portions of the blade for locking the blade member in adjusted position.

Another concept of this invention is to provide clamping means for the blade member, operable from the side opposite or away from the normal cutting edge of the tool bit and arranged in such manner that the normal tendency of the clamping element is to urge the blade member firmly in its seat by the application of a force acting substantially in the same direction as the component of the cutting forces upon the blade itself and to so arrange the clamping element as to be carried entirely within the body member and devoid of any projecting parts likely to interfere with the use of the tool in confined or restricted places, as for example, close to shoulders, chucks, etc.

These, and other objects hereinafter mentioned, have been attained by forming a tool holder from a solid substantially rectangular piece of metal and broaching or otherwise forming therein a longitudinal bore conforming to the general shape of the tool bit to be carried thereby. Another opening is formed in the holder, substantially perpendicular to and intersecting the blade opening, for the reception of the clamping element, the side walls of which is adapted to guide the clamp element against the blade member in a direction coincident substantially to the direction of the component of the cutting forces acting upon the blade. When the holder is constructed, for example, as to receive a square tool bit and otherwise adapted for lathe work, it will be seen that a clamping mechanism such as above explained locks the blade firmly to the bottom and side of the holder whereby the downward thrusts of the cutting action are transmitted directly to the body member, and the side or lateral thrusts of the cutting operation are transmitted directly to the side walls of the holder. Thus, there is provided an exceptionally strong and rigid support and lock for the blade of an insertable blade tool, capable of withstanding the excessive tooling forces common to the modern methods of machining.

It is to be noted, however, that this improved blade lock, although illustrated in connection with a single point tool, such as a lathe tool, obviously may, without departing from the principles underlying this invention, be adapted to lock the blade or blades of various other types of tools, such as, for example, the blades of a rotary cutter.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, drawing depicting a preferred typical construction has been annexed as a part of this disclosure and, in such drawing, like characters of reference denote corresponding parts throughout all the views, of which:—

Figure 1 of the drawing, indicates a side elevation of a representative type of tool to which the invention is peculiarly adaptable.

Figs. 2 and 3 are plan and front views, respectively thereof.

Fig. 4 is a vertical sectional view along the line 4—4 of Fig. 1.

Referring now more particularly to Figs. 1 and 2 of the drawing, the body of the holder comprises a one piece substantially rectangular shaped member 1, having a bore 2 formed therein and extending longitudinally thereof. Preferably the bore 2 is slightly inclined with respect to the major axis of the holder thereby to provide a suitable rake angle *a* at the cutting end of the tool bit 3.

The forward end of the holder preferably is tapered as at *b* to permit the use of the holder in places of small dimensions, and one of the side walls of the blade aperture cut away at *c* to expose the front side portion of the tool bit to permit same to be used as a side cutting tool. The opposite side wall *e* is left upstanding and cooperates with the projecting bottom wall *d* of the holder to re-enforce and support the extreme end of tool bit and absorb the laterally acting thrusts.

The shape of the tool bit 3 conforms generally to the shape of the bore 2 and when inserted therein is adapted to be clamped securely in place by means of a cam element 4 situated rearwardly of the cutting portions of the bit. For convenience of manufacture the cam element 4 is formed preferably from oval or cylindrical stock, it is to be understood, however, that the cam may be made rectangular or other shape if desired and, accordingly, I do not limit myself to the specific shape shown.

Referring to Figs. 1, 3, and 4 it will be observed that a bore 5 for the cam element extends transversely to the general axis of the tool bit and also is inclined at an angle with respect to a vertical longitudinal plane of the tool bit. The inclined bore 5 also intersects the bit bore 2 and is so constructed that when the clamping member 4 is inserted in the opening 5, a portion of the element is adapted to project into the bit opening 2 and engage the tool bit inserted therein.

Means have been provided for moving the member 4 firmly into engagement with the blade comprising an axially and laterally movable screw 6 uniquely arranged or positioned such that the impacts of the cutting operation upon the blade member are transmitted directly to the cam 4 and not through the threads or shank portion of the clamping screw proper. The head portion of the screw 6 engages the side of the holder 1 and the shank portion has a threaded engagement with the clamp member 4.

With reference to Figs. 1 and 2 of the drawing, it will be noted that the axis of the screw is transverse to the general axis of the tool and holder and lies in the same vertical plane as the axis of the clamp element. Accordingly, when the screw 6 is advanced into the clamp element the latter is moved downwardly and horizontally against the tool bit, the line of movement being substantially that of the general axis of the clamp element. An elongated aperture 8 for the screw 6 is provided in the body member to permit vertical movement of the screw as the clamping element is elevated or lowered.

Referring more particularly to Fig. 4 of the drawing, it will be observed that the underside of the cam element 4 is recessed as at *d* to provide a positive abutment for engagement with the tool bit, the portion *i* being adapted to be brought into engagement with the top of the bit and the surface *j* being adapted to engage the side of the bit. The two surfaces together cooperate with the inclined walls *f* and *g* to move the tool bit positively and firmly into engagement with the walls *d* and *e* of the holder, sufficient clearance being provided between the walls of the cam element and holder to compensate for any irregularities in shape or size of various sections of blade members.

As the cam element 4 is drawn into place, the recess *h* thereof engages and tends to move the tool bit 3 downward against the lower wall of the holder, and also to the side against the lateral supporting wall, the opposed surfaces *f* and *g* of the holder and clamp elements acting as a cam to effect a strong and secure lock and as substantial abutment means to resist upward movement of the blade.

Thus it will be seen that a blade holder fashioned as herein explained provides ample support and bearing surfaces for the blade along the full length thereof. The objectionable overhanging or projecting features of blade mounts heretofore employed are thereby eliminated and a more sturdy and rugged tool holder results. The large bearing surfaces of this improved holder that extend to points immediately adjacent the cutting portions of the blade, combined with the cam lock, insure that the blade member is accurately and rigidly clamped in adjusted position. Furthermore, the blades may be ground and reground until only a fraction of their original length remains without interfering with the rigidity or firmness of the complete assembled tool. By this invention extremely short sections of high speed steel or special alloys may be conservatively and efficiently used.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. In a lathe tool the combination of a one piece elongated body member having a central bore formed horizontally therein extending in the general direction of and coextensive with the length of the body member, the forward and rearward ends of the bore being closed on all sides; an elongated tool bit provided with a side and an intersecting end cutting-edge formed on the top surface thereof and at the forward end adapted to be inserted and clamped in said bore with said end cutting-edge projecting from the end thereof, said body member having a tooling side and an operating side and having its top and tooling side portions cut away at the forward end thereby exposing the end and side cutting edges of said bit to permit tooling operations to be performed and providing also bottom and back supporting surfaces for the end portion of said bit; and clamping means for clamping said bit firmly to said body member comprising a cam element having a floating fit in a recess formed in the body member and located entirely back of the plane of said tooling side of the body member adapted to engage the top and side surfaces of the tool bit for moving said bit in the general direction of the component of the tooling forces thereon firmly in engagement with said opposite side and bottom walls of the said bore; and screw means engaging and operable from the side of said body member remote from the said side cutting-edge of the bit and having a threaded connection with said cam element for effecting clamping movement of said cam element, said screw means being fitted to an elongated slot in said body member and adapted for bodily movement therein in accordance with the position assumed by said cam element.

2. A lathe tool combining a one piece elongated body member having a centrally disposed bit receiving bore coextensive with the length thereof, the forward and rear portions of said bore being closed on all sides, said member having a tooling side and an operating side; a tool bit adapted to fit said bore, said bit having cutting-edges formed on the top surface thereof at the forward end and at the tooling side; said body member having the top and tooling side portions thereof cut away at the forward end thereby exposing the end and side cutting-edges of said bit to permit tooling operations to be performed and providing also bottom and back supporting surfaces for the end portion of the tool bit; a cam element having a limited floating fit in a recess provided in the body member and located entirely back of the plane of said tooling side of said body member for urging said bit downwardly against said bottom surface and simultaneously laterally against said back supporting surface, said clamping movement being substantially coincident with the direction said bit tends to move under the reactionary pressures of the tooling forces acting upon the cutting-edges thereof; and means carried bodily with said cam element having a floating fit in the body member and operable from said operating side of the body member for effecting clamping action of the said cam.

OLE SEVERSON.